United States Patent [19]
Rogers et al.

[11] Patent Number: 5,688,136
[45] Date of Patent: Nov. 18, 1997

[54] FIRE FIGHTING TRAINER

[75] Inventors: William Rogers, Hopatcong; Dominick Musto, Middlesex; Steven Luftig, Oakland; David Joynt, Sparta, all of N.J.

[73] Assignee: Symtron Systems, Inc., Fair Lawn, N.J.

[21] Appl. No.: 573,406

[22] Filed: Dec. 15, 1995

[51] Int. Cl.$^6$ ........................ G09B 9/00
[52] U.S. Cl. ........................ 434/226
[58] Field of Search ........................ 434/226

[56] References Cited

U.S. PATENT DOCUMENTS

| | | | |
|---|---|---|---|
| H1134 | 2/1993 | Meadows | 434/226 |
| 4,001,949 | 1/1977 | Francis | 434/226 |
| 4,526,548 | 7/1985 | Livingston | 434/226 |
| 5,052,933 | 10/1991 | Rogers et al. | 434/226 |
| 5,181,851 | 1/1993 | Layton et al. | 434/226 |
| 5,203,707 | 4/1993 | Musto et al. | 434/226 |
| 5,266,033 | 11/1993 | Rogers et al. | 434/226 |
| 5,374,191 | 12/1994 | Herman et al. | 434/226 |
| 5,415,551 | 5/1995 | Semenza | 434/226 |
| 5,518,402 | 5/1996 | Tommarello et al. | 434/226 |
| 5,518,403 | 5/1996 | Luftig et al. | 434/226 |

*Primary Examiner*—Paul J. Hirsch
*Attorney, Agent, or Firm*—Richard T. Laughlin; Graham, Curtin & Sheridan

[57] ABSTRACT

A fire fighting trainer is provided for use in training fire fighters and passenger rescuers during aircraft simulated cabin fires and simulated landing gear fires and during simulated oil spill module fires. The trainer includes a mockup aircraft, a mockup fuel spill module, a liquid fuel and vapor fuel supply system, and a fire control system. A method of training fire fighters and passenger rescuers is also provided.

8 Claims, 1 Drawing Sheet

FIRE FIGHTING TRAINER

FIELD OF THE INVENTION

The invention generally relates to an aircraft rescue fire fighting trainer and, in particular, the invention relates to a mobile computerized aircraft rescue fire fighting trainer having a fuel spill module.

BACKGROUND OF THE INVENTION

The prior art aircraft fire fighting trainer is described in U.S. Pat. No. 5,415,551, issued to Semenza on May 16, 1995. Related publications and patents include U.S. Pat. Nos. 5,316,484, issued to Layton, et al. on May 31, 1994; 5,173,052, issued to Duncan, Jr. on Dec. 22, 1992; 4,526,548, issued to Livingston on Jul. 2, 1985; 4,001,949, issued to Francis on Jan. 11, 1977; H1134 (U.S. Invention Registration), issued to Meadows, et al. on Feb. 2, 1993; and SU 1444-874-A1 (Soviet Union), issued to Ivanov on Dec. 15, 1988.

The prior art fire fighting trainer includes a mobile mockup aircraft, a liquid fuel distribution and burner system having a liquid fuel supply line and having a burner control connected to the liquid fuel supply line and a central control connected to the burner control.

One problem with the prior art mobile fire fighting trainer is that there is no means to simulate a liquid fuel spill fire outside the aircraft.

A second problem is that there are no computer controls or sensors to provide automatic, consistent and safe responses to training activities in a fire training scenario.

A third problem is that there is no means to provide and use vapor fuel in the burner controls.

SUMMARY OF THE INVENTION

According to the present invention, an aircraft fire fighting trainer is provided. This trainer includes a mobile mockup aircraft which is subject to simulated inner and outer aircraft fires, a fuel spill module which is subject to a simulated fuel spill fire, a liquid fuel and vapor fuel supply system, a computerized and automatic fire control system and a power supply system.

By using the fuel spill module, a liquid fuel spill fire can be simulated alongside the aircraft.

By using a liquid fuel and vapor fuel supply system, the fuel spill module can be supplied with liquid fuel and the aircraft can be supplied with vapor fuel.

Also, according to the present invention, a method of training aircraft fire fighters is provided. This method includes:

forming a mockup aircraft having a vapor fuel burner for controlling inner and outer aircraft fires;

forming a module alongside the aircraft having a liquid fuel burner for controlling a fuel spill's fire;

supplying vapor fuel to the aircraft burner;

supplying simultaneously liquid fuel to the fuel spill module; and adjusting the flames of the aircraft fires and module fires.

One object of the present invention is to provide an aircraft fire fighting trainer having a vapor-fueled mockup aircraft burner control and having a liquid-fueled ground module burner control for simulating aircraft inner and outer fires and for simultaneously simulating a ground oil spill fire.

BRIEF DESCRIPTION OF THE DRAWINGS

The foregoing and other objects, features and advantages will be apparent from the following description of the preferred embodiment of the invention as illustrated in the accompanying drawings.

DESCRIPTION OF THE PREFERRED EMBODIMENT

Figure 1:
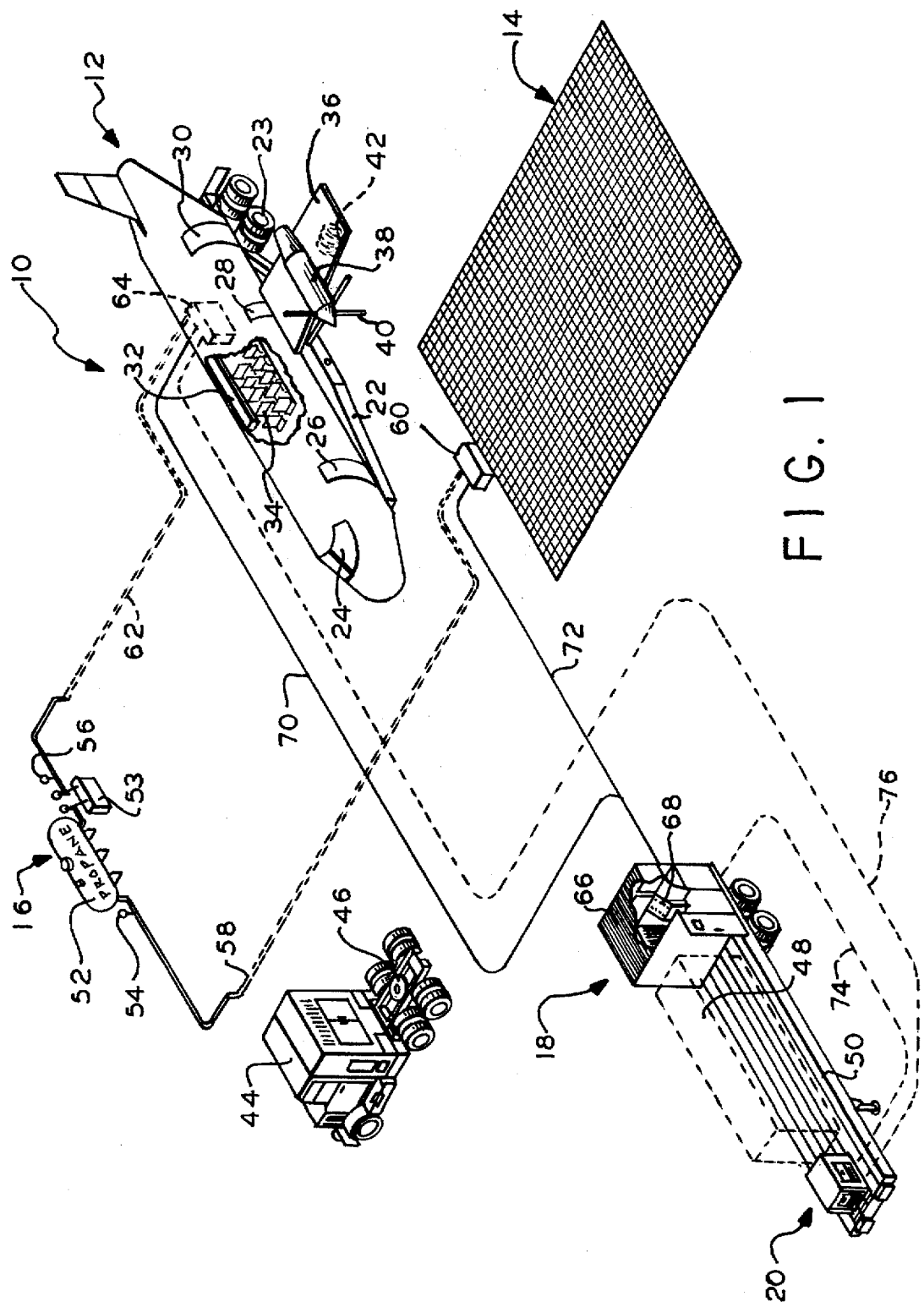
FIG. 1 is a perspective view of an aircraft fire fighting trainer according to the present invention.

As shown in FIG. 1, a mobile rescue fire fighting trainer or simulator or assembly 10 is provided. Trainer 10 has a mockup aircraft 12, which is subject to simulated inner and outer aircraft fires. Trainer 10 also has a fuel spill module 14, which is subject to a simulated fuel spill ground fires. Trainer 10 also has a combination liquid propane fuel and vapor propane fuel supply system 16. Trainer 10 also has a computerized and automated fire control system which is connected to both the liquid burner control and the vapor burner control. Trainer 10 also has a power supply unit or electrical generator 20.

Aircraft 12 has a support trailer 22. Trailer 22 has a plurality of wheels 23 and has an underside hitch (not shown). Aircraft 12 also has a front window 24 and side doors 26, 28, 30. Aircraft 12 also has a cabin or cabin structure 32 which has a plurality of mockup seats 34. Aircraft 12 also has a left side wing 36, which has an engine 38 that has a propeller 40. Wing 36 has a plurality of landing gear wheels 42. Aircraft trailer 22 has a front separate cab 44, which is normally parked in a safe area. Cab 44 has a fifth wheel unit 46 for connection to a trailer hitch (not shown).

Fuel spill module 14 forms a planar assembly when in use. Module 14 can be disassembled into separate components or segments (not shown) and stored on a middle portion 48 of a secondary trailer 50. Trailer 50 has an underside hitch (not shown) which can be connected to fifth wheel unit 46 on cab 44 in order to transport module 14 to a new site or facility.

Fuel supply system 16 has a propane tank 52, and has tank components (not shown). Tank 52 has a propane liquid-to-vapor converter or component 53. Tank 52 has a near side liquid valve 54. Tank 52 also has a far side vapor valve 56. Liquid fuel valve 54 connects to a liquid pipe or pipeline 58, which connects to a liquid fuel spill burner control 60, that is disposed next to liquid spill module 14 for making the liquid fuel spill simulated fire. Vapor fuel valve 56 connects to a vapor pipe 62, which connects to a vapor fuel aircraft burner control 64. Vapor fuel control 64 has inner and outer feed pipes (not shown) which have feed pipe outlets (not shown) that are disposed next to inner seats 34, outer landing gear wheels 42, and other locations, for causing selective flame patterns and sizes. Liquid fuel control 60 also has feed pipes (not shown), which have feed pipe outlets (not shown), for causing selective flame patterns and sizes.

Fire control system 18 has an operator enclosure 66 which is mounted on a second trailer 50 at the rear end thereof, or which may be removed from the second trailer. Enclosure 66 has a control computer or control panel 68 for automatic operation and for manual operation. Panel 68 has an electrical control cable 70 which connects to aircraft burner control 64. Panel 68 also has an electrical control cable 72 which connects to fuel spill burner control 60. Cables 70, 72 each has a plurality of conductors (not shown) for sending control signals to controls 60, 64 and for returning sensor signals from controls 60, 64 to panel 68. Controls 60, 64 are connected to respective groups of sensors (not shown). Each sensor group may include a temperature sensor, a propane sensor, an air sensor, an extinguishing agent detection sensor or the like.

Generator 20 has a cable or conductor 74 which connects to panel 68. Generator 20 also has a cable or conductor 76 which connects to control 64. Generator 20 is mounted on second trailer 50 at a front end thereof.

In operation, mockup aircraft 12 and mockup module 14 are positioned on the ground. The liquid fuel and vapor fuel supply system 16 is connected to the mockup aircraft 12 and mockup module 14. The fire control system 18 is connected to the liquid fuel and vapor fuel system 16. The supply system 16 feeds propane liquid to burner 60 to cause a simulated fire on module 14, and feeds propane vapor to the burner 64 to cause simulated fires at cabin seats 34 and the engine 38 and landing gear wheels 42. The fire fighters are then trained to evacuate passengers and to extinguish the fires at seats 34, engine 38, and wheels 42 of aircraft 12, and to extinguish fires at module 14. The fire control system 18 regulates the fuel flow at burners 60, 64, and receives signals from sensors (not shown) for automatic and manual operation of control panel 68.

A method of training fire fighters includes the steps of mounting a mockup aircraft and a mockup oil spill module on grade; supplying propane vapor to a burner control at the aircraft; supplying propane liquid to a burner control at the oil spill module; regulating flows at the burner controls using sensor signals from sensors located near the fires; and exposing fire fighters to selective fires for extinguishing such fires.

The present invention provides for training of fire fighters in two areas. The first area of training is the large scale fuel spill fire module 14 which, for training purposes, is presented as an obstacle to the fire fighters attempting to reach the aircraft fire trainer 12. The instructor initiates the training fire by selecting certain parameters for the fire, such as its size, which may be the full size burn area or some portion of full size, and various levels of extinguishment difficulty, such as easy, moderate or difficult. After automatic confirmation of the pilot flame, the control system 18 begins flow of propane to consecutive burner elements, confirming ignition of one element before starting propane flow to the adjacent elements.

As the fire fighters apply extinguishment agents to the fire, such as water or foam or a suitable surrogate for foam, agent detectors (not shown) within each segment of the fire area signal the detection of agent to the control system 60, which is configured to reduce and stop propane flow to each element to extinguish the fuel spill fire automatically so that its response is the same as that of an actual fuel spill fire. Should an emergency occur, the instructor or the safety officer will be able to stop the fire immediately by activating appropriate emergency stop switches.

The second area of training is the aircraft mockup 12, where fire fighters will extinguish external aircraft fires, enter the aircraft mockup through the entrance doorway or emergency exits 26, 28, 30, extinguish internal fires and engage in rescue procedures. Safe and realistic training in extinguishment of internal fires is possible because of the trainer's automatic control system and safety monitoring system 18.

The instructor will select one or more of the external and internal fires for operation, including an engine fire, a landing gear fire, a main cabin fire, an electrical fire and other such fires as might occur on an aircraft. The instructor will set parameters for each fire which may include the height of the flame, the spread rate of the fire, the difficulty of extinguishment or other appropriate parameters. The fire may include smoke which is controlled automatically.

When each fire is initiated, its continuous pilot flame is ignited and confirmed, and propane flow is started to the burner elements 64 within the fire's mockup structure to produce the fire's main flame, such as at the exhaust of the engine or across the seats of the main cabin.

Within the aircraft mockup 12, conditions, including temperature and concentrations of propane that might accumulate, are continuously monitored for safety by the trainer's control system. If temperature reaches a preset maximum level, or if propane concentrations reach a preset percentage of the LEL (least explosive limit) for propane in air, the fire will automatically be extinguished and the trainer's ventilation fan (not shown) will automatically start to exhaust the hazardous atmosphere within the trainer and bring in fresh air.

When the fire fighters begin application of extinguishing agent to a fire, agent detectors (not shown) within the fire area signal the control system 16 as to the pattern and amount of application. This serves two purposes. First, the control system will adjust propane flow automatically to reduce and extinguish the flame so that the training fire's response is the same as that of an actual fire and, therefore, the fire fighter is exposed to an accurate and consistent training fire. Second, since agent application suppresses the propane-fueled flame and may temporarily extinguish it, the immediate automatic reduction of propane flow to the training fire significantly reduces the likelihood of any accumulation of unburned propane, thereby permitting the exercise to continue without a propane detection safety shutdown. Without automatic response to agent detections and propane detection safety shutdown, accumulations of propane could quickly reach explosive concentrations and could ignite from pilot flames, igniters or residual flames, resulting in injury or death to personnel within the trainer.

The advantages of trainer 10 are indicated hereafter.
A) Trainer 10 provides an apparatus for training to fight simulated aircraft fires and, simultaneously, for training to fight simulated fuel spill ground fires.
B) Fuel supply system 16 provides a combination propane liquid for the oil spill module control 60 and propane vapor or gas for the aircraft control 64.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:
1. In a fire fighting trainer comprising:
  a liquid fuel supply system; a mockup aircraft containing fireplaces for simulating aircraft fires in the aircraft; and
  a fire control system, the improvement which comprises a liquid fuel spill module for simulating a fuel spill fire adjacent to the aircraft, a fuel converter for converting some of the liquid fuel to vapor fuel and conduit means for supplying the liquid fuel to the liquid fuel spill module and conduit means for supplying the vapor fuel to the fireplaces.
2. The trainer of claim 1, including a power supply unit connected to the fire control system.

3. The trainer of claim 2, wherein the mockup aircraft includes:

a support trailer which has a plurality of wheels for mobility and which has a plurality of doors and which has a cabin that has a plurality of seats to simulate a cabin fire and which has a wing portion that has an engine with a propeller to simulate an engine fire and which has a landing gear unit to simulate a landing gear fire.

4. The trainer of claim 3, wherein the liquid fuel spill module includes:

a plurality of module segments for ease of shipping to another site; and a secondary trailer having a storage space for the segments for mobility of the module.

5. The trainer of claim 4, wherein the liquid fuel supply system includes:

a propane tank having a liquid propane valve;

a propane vapor valve connected to the converter;

a liquid propane pipeline connected to the liquid propane valve;

a propane vapor pipeline connected to the propane vapor valve;

a liquid propane burner control connected to the liquid propane pipeline for the oil spill fire; and a propane vapor burner control connected to the propane vapor pipeline for the aircraft fires.

6. The trainer of claim 5, wherein the fire control system includes:

a central control panel for computerized automatic control and monitoring;

a panel enclosure enclosing the panel and mounted on the secondary trailer;

the panel having an electrical cable which is connected to the propane vapor burner control; and the panel having a second electrical cable which is connected to the liquid propane burner control.

7. The trainer of claim 6, wherein the power supply unit includes a first electrical cable which is connected to the panel; and a second electrical cable which is connected to the propane vapor burner control.

8. A method of training fire fighters, including the steps of:

mounting a portable mockup aircraft and a portable mockup fuel spill module on the ground; supplying liquid propane from a tank of liquid propane fuel;

converting a portion of the liquid propane to vapor propane;

supplying the propane vapor to a burner control at the aircraft;

supplying a portion of propane liquid to a burner control at the fuel spill module;

regulating propane vapor flow at the aircraft burner control to simulate the selected fire sequence;

regulating propane liquid flow at the module burner control to simulate the selected fire sequence;

receiving sensor signals caused by the aircraft fires to indicate the selected fire sequence;

receiving sensor signals caused by the module fires to indicate the selected fire sequence; and exposing fire fighters to the selected fires sequences to permit extinguishing such fires.

* * * * *